Figure 1:
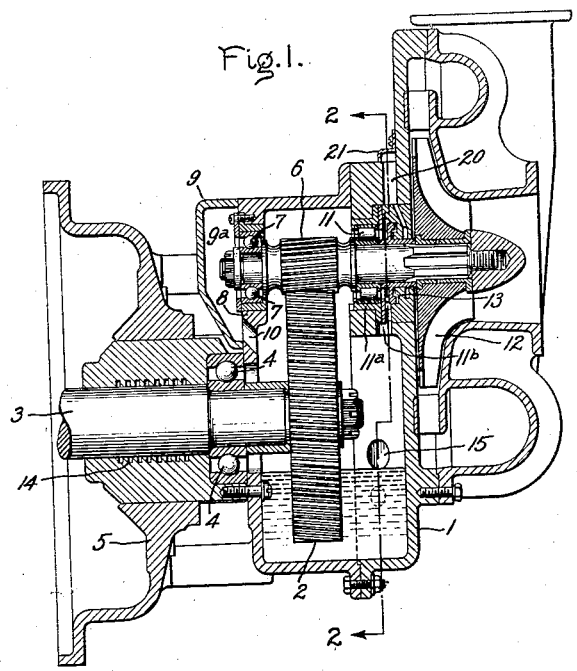

Sept. 25, 1934.   S. R. PUFFER   1,974,974
LUBRICATION OF HIGH SPEED GEARS AND BALL BEARINGS Filed Dec. 1, 1930

Inventor:
Samuel R. Puffer,
by Charles E. Tullar
His Attorney.

Patented Sept. 25, 1934

1,974,974

UNITED STATES PATENT OFFICE 1,974,974

LUBRICATION OF HIGH SPEED GEARS AND BALL BEARINGS

Samuel R. Puffer, Saugus, Mass., assignor to General Electric Company, a corporation of New York Application December 1, 1930, Serial No. 499,153

4 Claims. (Cl. 184—13)

The present invention relates to the lubrication of high speed gears and high speed ball bearing or roller bearings, the ball bearing or roller bearings and gears being used in combination with each other or individually.

By high speed ball bearings or roller bearings I mean ball bearings or roller bearings which rotate at a minimum speed of the order of 8,000 R. P. M. and from there up to speeds of the order of 30,000 or 40,000 R. P. M. or higher. By high speed gears I mean gears which have a pitch line velocity of 4,000 feet per minute or higher, or which rotate at speeds of the order of 8,000 R. P. M. or higher.

The generally accepted practice of lubricating ball bearings or roller bearings operating at the speeds referred to has been by the use of light oil. The light oil is supplied to the bearings either by maintaining a constant level which extends about half way up the ball or roller at the lowest part of the bearing; by the use of a wick, the lower end of which dips into a reservoir of light oil, the upper end furnishing a small amount of oil to the bearing, and by the use of a slinger or some other similar rotating device, the lower part of which picks up oil from the reservoir and by the rotation, breaks up this oil into a fine mist which permeates the bearing housing and thus affords lubrication to the bearing.

In connection with lubricating high speed ball bearings or roller bearings with light oil, it has been found that too much lubricant is much worse than too little. This is due to the fact that oil in common with other fluids is in reality a hard substance when some particle, traveling at a high rate of speed, comes into contact with it. For instance, a solid drop of oil in the race of a ball bearing traveling at high speed would create a very definite bump as a ball passed through it and a continuity of such drops may cause vibration and rough running, which shortens the life of a bearing. Too much oil will also cause churning with consequent foaming and overheating, which is also hard on the bearing and causes the oil to carbonize and so lose its effectiveness. Prior to my invention, the use of light oil has been the only successful means of lubricating high speed ball bearings or roller bearings.

The conventional method of lubricating high speed gear trains is to spray oil in a thin film between the gears at or near the engaging point, so that the oil will be carried through the arc of contact of the gear teeth, do the necessary lubricating and do whatever cooling is necessary. Here again, as in the case of the ball bearing or roller bearings, the hardness of liquid oil is sometimes encountered with the result that the gear teeth become pitted after a comparatively short time. A variation of this system of lubricating high speed gear trains is to spray the oil on the disengaging faces of the gears. This provides the necessary cooling effect and the rapid rotation of the gears breaks the oil up into a fine mist which fills the entire gear chamber. This mist is sufficient to lubricate the gear teeth faces and does not introduce any solid drops or sheets of oil between the gear teeth. In either case, however, it is necessary to have an oil pump to provide the stream of oil, drain pipes, and an oil sump to which the used oil is carried for cooling and settling before returning it to the gear teeth.

A form of lubricant which has certain advantages over oil is grease, it being understood that by grease I mean a soap thickened mineral oil. As is known, a grease may be thin or thick, its characteristic being not its consistency but its composition. Grease has been used for the lubrication of slow speed gearing and slow speed ball and roller bearings, but prior to my invention it has been considered not practical for the lubrication of high speed gearing and high speed ball bearings or high speed roller bearings.

I have discovered a system or means for lubricating high speed ball bearings and roller bearings and high speed gears by means of grease, preferably relatively heavy grease, which means or system is effective, simple, economical and overcomes many of the troubles and objections heretofore met with in connection with the lubrication of high speed gears and high speed ball bearings and roller bearings by means of oil.

By my invention, the grease can be applied to the high speed ball bearing or roller bearings or the high speed gears, or any combination thereof, by means of a common type of grease gun. The system does away entirely with any oil pumps, oil piping, oil coolers and separate reservoirs.

I have discovered that a high speed ball bearing or roller bearing or a high speed gearing can be successfully lubricated with grease if the following conditions are fulfilled:

1. The amount of grease supplied to the casing of the high speed ball bearing or roller bearing or the high speed gearing is definitely limited to an amount such that during operation pressure above atmosphere will not be built up in the casing.

2. The building up of pressure above atmosphere in the casing due to centrifugal action of the ball bearing or roller bearings or gears, or due to changes in temperature, is prevented.

3. The casing is so constructed that circulation of the grease through the ball bearings or roller bearings and the gears is insured, whereby pocketing of the grease where it may dry out and harden is prevented.

To fulfill the first condition, the level of grease in the casing should be not higher than the middle of the casing when the ball bearings or roller bearings or the gearing is operating under normal conditions and preferably not higher than one-third the distance from the bottom of the casing. To insure that this condition obtains, I preferably provide the casing with an overflow opening which serves definitely to limit the amount of grease which can be supplied to the casing. Grease is most advantageously supplied to the casing through a nipple by means of a grease gun and preferably I locate the filling nipple and overflow opening directly adjacent to each other and provide a common cover for them. By this means it is insured that whenever grease is being added to the casing, the overflow opening is uncovered. To insure the proper level, the grease is added when the ball bearings or roller bearings or the gearing is operating and I find it of advantage to locate the overflow opening in the side of the casing at which the direction of rotation of the gears is upward, so that outflow of grease through the opening is assisted by the rotation and the pumping action of the gears, and offset from the direct line of the gears so that grease will not be thrown directly out by centrifugal force.

To fulfill the second condition, I provide a vent opening in the upper portion of the casing which connects the interior of the casing to atmosphere. Preferably the vent opening comprises a pipe connected to the top of the casing and extending downwardly outside the casing so as to prevent the entry of foreign matter into the casing. Also, I find it advantageous to provide a shield over the vent opening inside the casing to prevent grease being thrown out through it by the action of the gears.

To fulfill the third condition, I make the casing so that all parts slope downward toward the lowest point of the casing, which is directly below the gear train and closely adjacent to the outer periphery of the lowest gear wheel, and I avoid all corners, pockets or projecting shelves in which grease could lodge and dry out and cake, and I so arrange the ball bearings or roller bearings that grease can circulate through them.

In carrying out my invention, I utilize preferably a grease having a consistency such that it will just pour slowly at the normal operating temperature. The use of a grease harder than this is not so satisfactory in that it does not vent well through the discharge opening for limiting the grease level so that too much grease might be put into the casing by an unskilled attendant, and does not circulate as well through the bearings. On the other hand too thin a grease may cause a churning action resulting in loss of efficiency.

Figure 2:
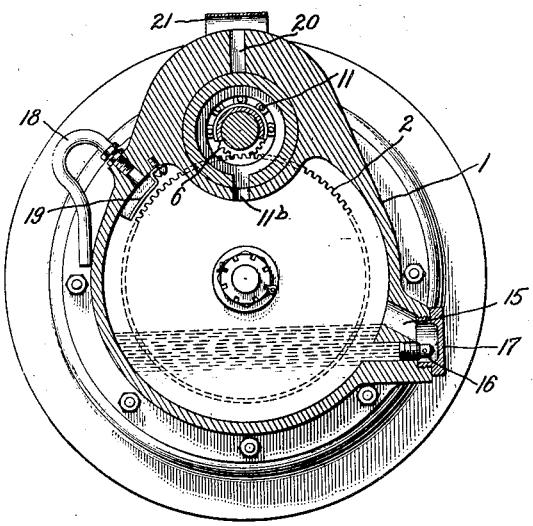

In the drawing, Fig. 1 is a vertical sectional view of apparatus embodying my invention, and Fig. 2 is a detail sectional view taken on line 2—2, Fig. 1.

Referring to the drawing, 1 indicates a gear casing in which is located a driving gear 2 attached to the end of a shaft 3, which may be, for example, the shaft of an electric motor. Shaft 3 is supported in a ball bearing 4 mounted in the head 5 of the motor casing. In the present instance, ball bearing 4 is what would be termed a low speed bearing, shaft 3 having a speed of the order of 3600 R. P. M. for example: The driving gear 2 meshes with a high speed pinion 6. The left-hand end of the pinion shaft is mounted in a high speed ball bearing 7 carried in a web 8 in the gear casing, the web forming with the side of the cap 9 a chamber 9$^a$ which is connected at its lower end with the casing proper by a drain passage 10. The other end of the pinion shaft is mounted in a high speed roller bearing 11 carried by the casing wall. The roller bearing 11 mounted in a housing 11$^a$ and at its outer end is provided with a drain passage 11$^b$ which communicates with casing 1. In the present instance, the gearing is shown as driving the impeller 12 of a centrifugal compressor. However, this is only by way of example, it being understood that the gearing may drive any suitable device. In connection with the high speed bearing 11 there is provided a combined rotating thrower and labyrinth packing 13 which prevents escape of grease around the high speed shaft. Similarly, in connection with shaft 3 I provide a labyrinth packing 14 for preventing escape of grease around the motor shaft.

For definitely fixing the level of the grease in the casing, that is, for definitely limiting the amount of grease which can be put into the casing, I provide an overflow opening 15 located in the lower half of the casing and offset from the plane of the gear wheel 2. This overflow opening prevents an accumulation of grease in the casing to an amount such that a pressure above atmospheric will be created in the casing. I have found that the presence of sufficient grease in the casing to set up a pressure results in excessive heating and destruction of the bearings and gears. For supplying grease to the casing, I provide an ordinary grease gun nipple 16 through which grease may be forced by a usual type of grease gun. Preferably nipple 16 is located directly adjacent to opening 15 and the two are provided with a common cover 17. This arrangement forms an interlock between the nipple and the opening which serves to prevent grease being added to the casing unless opening 15 is uncovered. Grease is added to the casing ordinarily when the gearing is running so that the level defined by opening 15 represents what may be termed the running level. This means somewhat more grease than just the capacity of the casing up to the opening 15 for during operation grease is splattered around and hangs on the sides of the casing.

Connected to the casing is an atmospheric vent or breather pipe 18 which serves to relieve any pressure created in the gear casing by the centrifugal action of the gears, by changes in temperature, or other causes. It preferably comprises a length of pipe bent to point downward so that no dirt or dust will enter from the outside. Inside the casing adjacent to the vent is a small baffle 19 which covers the vent and prevents grease from being thrown into the vent or breather pipe by the pumping action of the gears.

In the case of a centrifugal compressor, it is desirable to prevent pressure from the discharge side of the compressor from reaching the gear casing, and for this purpose I provide a passage 20 which connects the rear side of the impeller to atmosphere, the outer end of the passage being protected by a cover 21 which prevents the entrance of dust or dirt. In the case of a centrifugal exhauster, the passage 20 would serve to break the suction at this point so air and grease vapor in the gear casing would not be sucked out by the impeller.

When the gearing is running, there is a very slight current of air coming out of both vents 18 and 20, and this affords protection against any possibility of dust or moisture entering the gear casing.

The casing 1 is made wide enough so as to leave a reasonable distance between the gears and the sides of the casing to allow room for the necessary grease. Also as will be clear from Fig. 2, the casing is formed with smooth inner surfaces arranged so that all parts slope downward toward the bottom of the casing and there are no covers, pockets or projecting shelves where grease can lodge. All corners are rounded, conforming generally to the contour of the gears.

In operation, gear wheel 2 dips into the grease and in rotating acts as a pump, splattering grease over the inner surface of the casing and carrying grease through the point of contact of the gears to lubricate the gear teeth. Grease, as it comes through the point of contact of the gears, is squeezed out axially toward the high speed ball bearing 7 and the high speed roller bearing 11 which it also lubricates. After passing through the bearings it returns again to the main casing through the vents or passages 10 and 11b. These vents are quite large, open downward toward the bottom of the casing, and are so located that there are formed no pockets into which grease can settle. The grease splattered around on the inside of the casing slowly runs down to the bottom of the casing and is again picked up by the gear wheel 2. Thus all the grease is kept in circulation.

I have found that the best results are obtained with a grease which at the normal operating temperature of the gearing pours slowly. With a grease of this consistency, the grease slowly runs down the sides of the casing to the bottom of the casing, so that there is established a not too deep pool in the bottom of the casing in which the teeth of gear wheel 2 dip. If too stiff grease is used, the gear wheel 2 has a tendency to cut a groove through it and does not circulate sufficient grease for most effective lubrication. If too thin grease is used, it runs down the walls of the casing rapidly forming a pool of considerable depth. The gear 2 dipping in this pool and rotating at high speed, results in the setting up of a water brake action which causes loss in power, overheating and a resulting decrease in the lubricating value of the grease.

In connection with the claims, it is to be understood that by the term grease I mean specifically, soap thickened mineral oil and by the term rolling bearing I mean either a ball bearing or a roller bearing.

What I claim as new and desire to secure by Letters Patent of the United States, is:

1. The method of lubricating gears which operate at speeds of the order of 8,000 R. P. M. or higher and which are located in a casing, which comprises supplying grease to the casing to a level not greater than one-half the depth of the casing and venting the casing to avoid the building up of pressure in the casing due to action of the high speed gears.

2. The method of lubricating gears which operate at speeds of the order of 8,000 R. P. M. or higher and which are located in a casing, which comprises supplying grease of a consistency such that it pours slowly at the operating temperature of the gears to the casing to a level not greater than one-half the depth of the casing and venting the casing to avoid the building up of pressure in the casing due to action of the high speed gears.

3. The combination with a casing and a high speed gearing mounted therein, of an opening in the casing for supplying grease to it, an overflow opening in the casing for limiting the amount of grease which can be supplied to the casing, and a common cover for said openings whereby grease cannot be supplied to the casing unless the overflow opening is uncovered.

4. In combination a casing, a high speed shaft mounted in the casing, rolling bearings for supporting said shaft, a second casing adjacent the first-named casing, a centrifugal impeller in said second casing mounted on said shaft, means for supplying grease to the first-named casing, means for limiting the amount of grease in said first-named casing, and packing means on the shaft between the impeller and the adjacent rolling bearing, said packing means comprising a labyrinth adjacent to such rolling bearing and a vented chamber between the labyrinth and the impeller.

SAMUEL R. PUFFER.